(12) United States Patent
Xue et al.

(10) Patent No.: US 11,621,756 B2
(45) Date of Patent: Apr. 4, 2023

(54) CONFIGURED GRANT FOR BEAMFORMING ALIGNMENT IN NR SL MODE 1

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US); Sony Akkarakaran, Poway, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/308,492

(22) Filed: May 5, 2021

(65) Prior Publication Data
US 2022/0360302 A1     Nov. 10, 2022

(51) Int. Cl.
*H04B 7/06* (2006.01)
*H04W 92/18* (2009.01)

(52) U.S. Cl.
CPC ........... *H04B 7/0617* (2013.01); *H04B 7/063* (2013.01); *H04W 92/18* (2013.01)

(58) Field of Classification Search
CPC ...................................................... H04B 7/0617
USPC .......................................................... 375/267
See application file for complete search history.

(56) References Cited

U.S. PATENT DOCUMENTS

| | | | |
|---|---|---|---|
| 2013/0258885 A1* | 10/2013 | Yu | H04B 7/0695 370/252 |
| 2020/0260231 A1* | 8/2020 | Ganesan | H04L 1/1671 |
| 2020/0314916 A1* | 10/2020 | Park | H04W 4/40 |
| 2022/0007403 A1* | 1/2022 | Li | H04W 72/1289 |

* cited by examiner

*Primary Examiner* — Lihong Yu
(74) *Attorney, Agent, or Firm* — Procopio, Cory, Hargreaves & Savitch/Qualcomm incorporated

(57) ABSTRACT

CG-based sidelink beamforming alignment is disclosed. The initiator UE may receive, from a base station, a CG indicating one or more CG resources for a beamforming alignment procedure. The initiator UE may transmit, to at least one responder UE via one or more Tx beams on the one or more CG resources, beam-sweeping SCI for the beamforming alignment procedure. The beam-sweeping SCI may include at least one of: a Tx beam index, a time period to monitor for beam-feedback SCI, or a time window including CG occasions for a same beam transmission of ACK SCI. The initiator UE may monitor, over the time period, for beam-feedback SCI from the at least one responder UE. The initiator UE may receive, from the at least one responder UE, the beam-feedback SCI within the time period.

28 Claims, 11 Drawing Sheets

CONFIGURED GRANT FOR BEAMFORMING ALIGNMENT IN NR SL MODE 1

BACKGROUND

Technical Field

The present disclosure relates generally to communication systems, and more particularly, to a beamforming alignment procedure for sidelink communication in a wireless communications system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an initiator/first user equipment (UE). The apparatus may receive, from a base station, a configured grant (CG) indicating one or more CG resources for a beamforming alignment procedure. The apparatus may transmit, to at least one second UE via one or more transmission (Tx) beams on the one or more CG resources, beam-sweeping sidelink control information (SCI) for the beamforming alignment procedure. The beam-sweeping SCI may include at least one of: a Tx beam index, a time period to monitor for beam-feedback SCI, or a time window including CG occasions for a same beam transmission of beam-acknowledgement (ACK) SCI. The apparatus may monitor, over the time period, for beam-feedback SCI from the at least one second UE.

In an aspect of the disclosure, a method, a computer-readable medium, and an apparatus are provided. The apparatus may be a responder/second UE. The apparatus may receive, from at least one first UE via one or more reception (Rx) beams on one or more CG resources, beam-sweeping SCI for a beamforming alignment procedure. The beam-sweeping SCI may include at least one of: a Tx beam index, a time period for monitoring for beam-feedback SCI, or a time window including CG occasions for a same beam transmission of beam-ACK SCI. The apparatus may transmit, to the at least one first UE, the beam-feedback SCI within the time period. The apparatus may monitor, over the one or more CG resources, for beam-ACK SCI based on the transmitted beam-feedback SCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
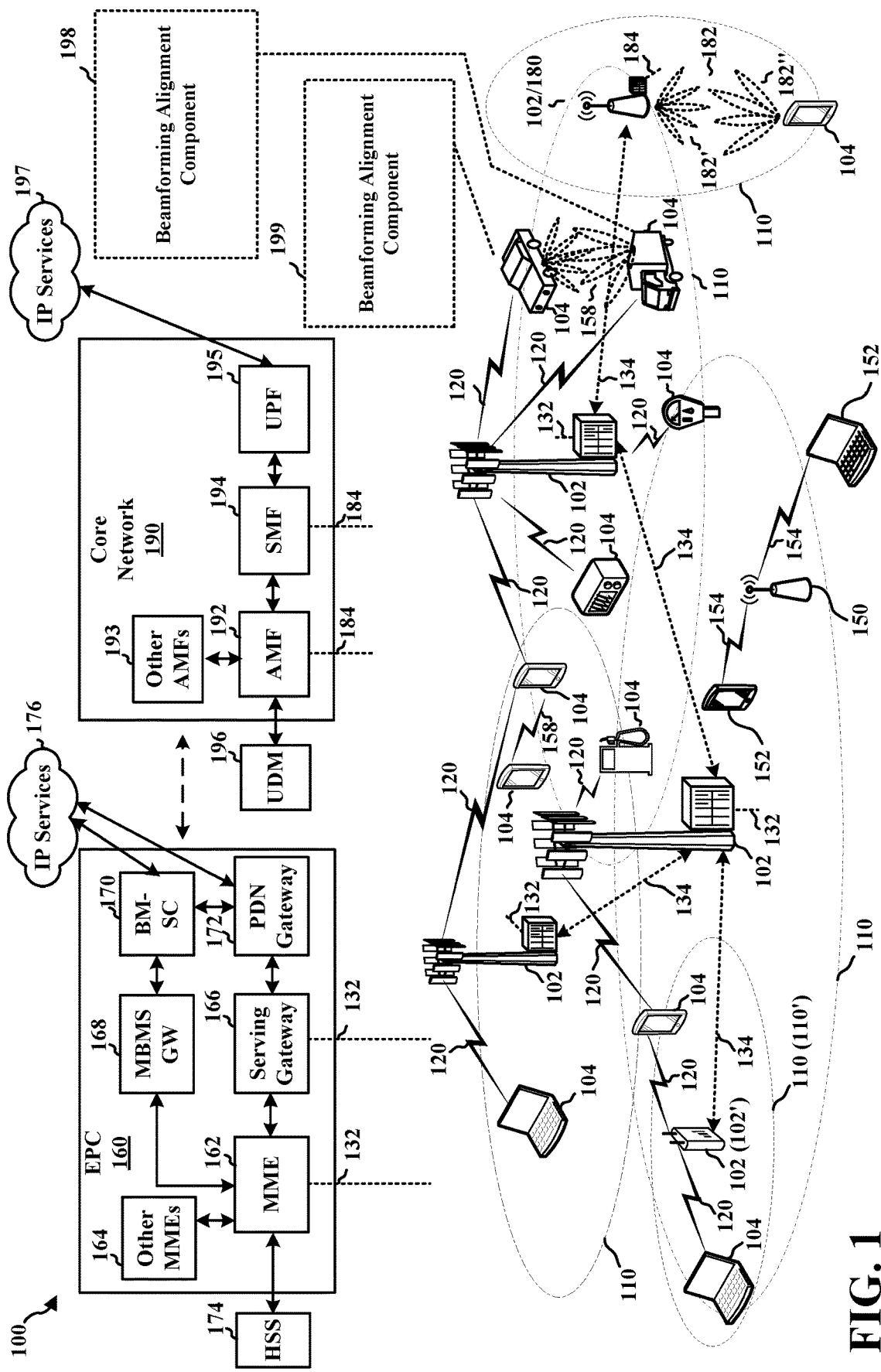
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first UE 104 may include a beamforming alignment component 198 that may be configured to receive, from a base station, a CG indicating one or more CG resources for a beamforming alignment procedure. The beamforming alignment component 198 may be configured to transmit, to at least one second UE via one or more Tx beams on the one or more CG resources, beam-sweeping SCI for the beamforming alignment procedure. The beam-sweeping SCI may include at least one of: a Tx beam index, a time period to monitor for beam-feedback SCI, or a time window including CG occasions for a same beam transmission of beam-ACK SCI. The beamforming alignment component 198 may be configured to monitor, over the time period, for beam-feedback SCI from the at least one second UE. In certain aspects, a second UE 104 may include a beamforming alignment component 199 that may be configured to receive, from at least one first UE via one or more Rx beams on one or more CG resources, beam-sweeping SCI for a beamforming alignment procedure. The beam-sweeping SCI may at least one of: a Tx beam index, a time period for monitoring for beam-feedback SCI, or a time window including CG occasions for a same beam transmission of beam-ACK SCI. The beamforming alignment component 199 may be configured to transmit, to the at least one first UE, the beam-feedback SCI within the time period. The beamforming alignment component 199 may be configured to monitor, over the one or more CG resources, for beam-ACK SCI based on the transmitted beam-feedback SCI. Although the following description may be focused on 5G NR, the concepts described herein may be applicable to other similar areas, such as LTE, LTE-A, CDMA, GSM, and other wireless technologies.

Figure 2:
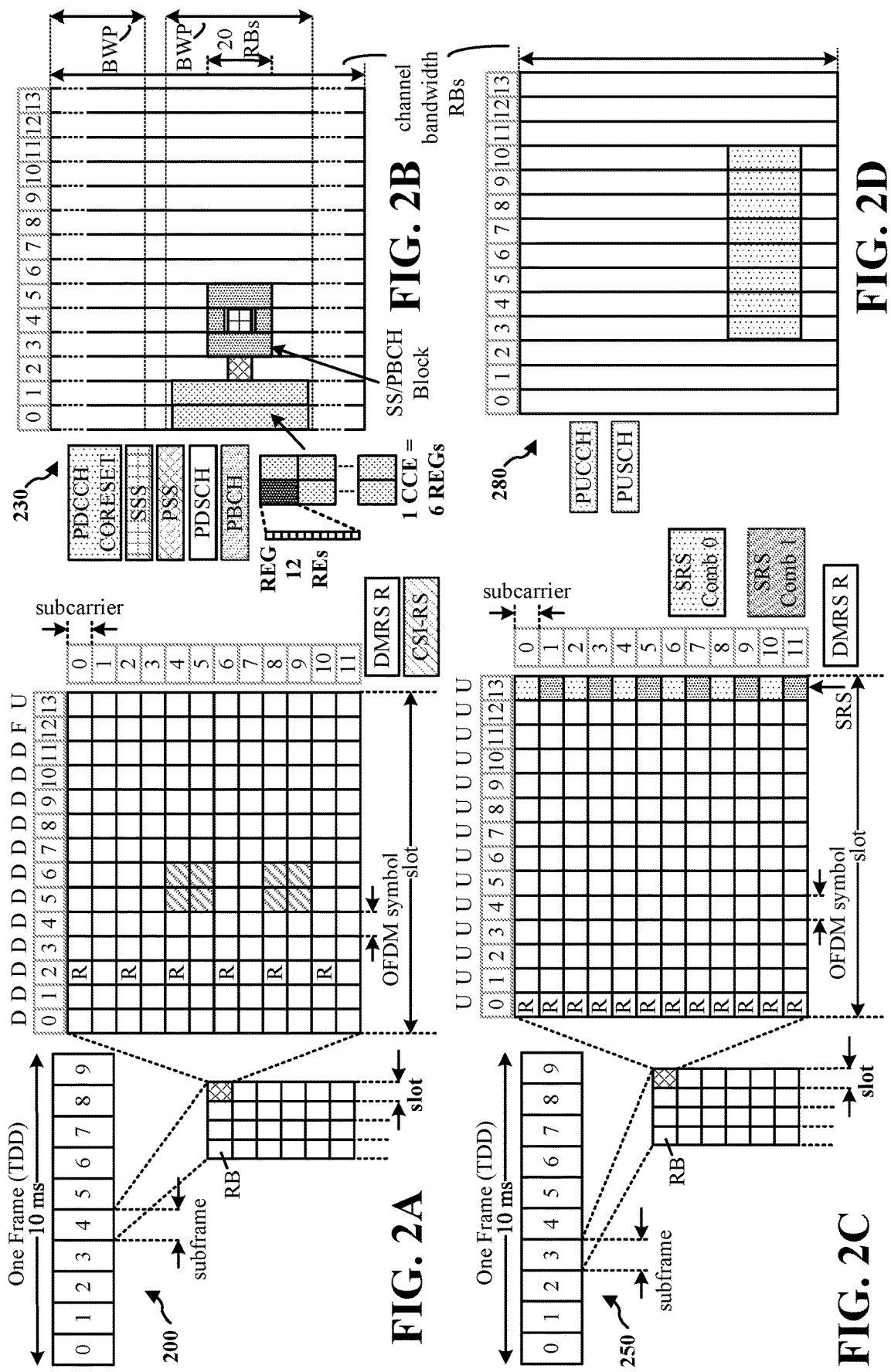
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
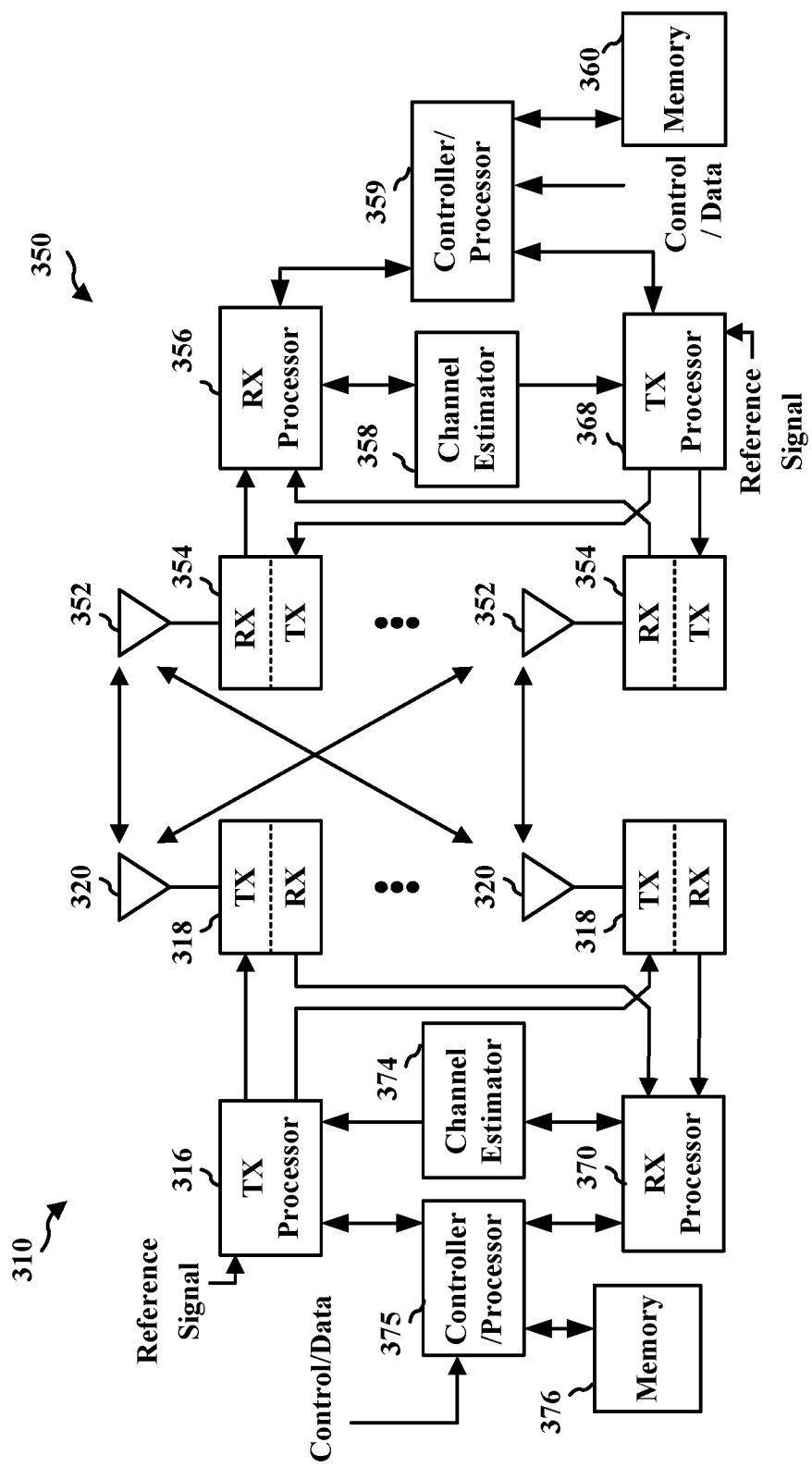
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 and/or 199 of FIG. 1.

NR sidelink communication may often be used in vehicle-to-everything (V2X) use cases in the intelligent transport systems (ITS) band (e.g., 5.9 GHz) or other sub-6 GHz licensed bands. Deployment of the NR sidelink in the millimeter wave (mmW) band may call for further optimizations. Also, NR sidelink communication may operate in one of the specified access or resource allocation modes. Specifically, mode 1 is specified for in-coverage development. When utilising mode 1, an NR sidelink transmitter may receive a grant, which may be either a dynamic grant (DG) or a configured grant (CG), from a base station for sidelink channel access.

Deployment of NR sidelink in unlicensed bands (e.g., the 60 GHz unlicensed band and the 6 GHz unlicensed band) has been considered. Beamforming alignment may achieve a reasonable data rate with NR sidelink communication over a higher frequency, especially a mmW, link. Aspects described herein may be related to a CG-based scheme for beamforming alignment between a pair of sidelink UEs operating in mode 1.

Figure 4:
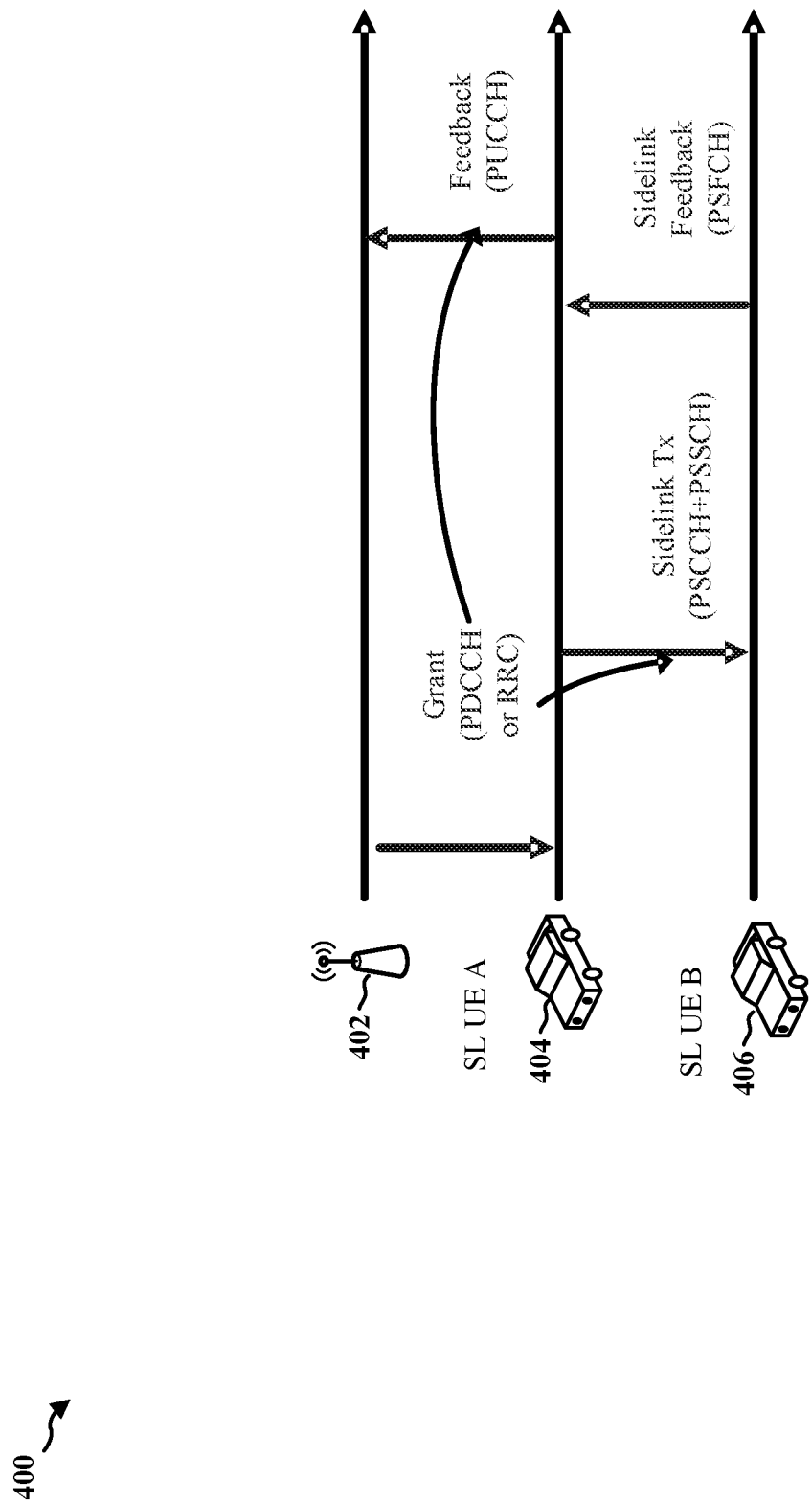
FIG. 4 is a diagram illustrating example NR sidelink communication in mode 1.

FIG. 4 is a diagram 400 illustrating example NR sidelink communication in mode 1. A first sidelink UE 404 may receive a grant from the base station 402 for a transmission to a peer second sidelink UE 406. The grant may be issued by the base station 402 based on a report transmitted by the first sidelink UE 404 to the base station 402. In particular, the first sidelink UE 404 may transmit a scheduling request (SR) or a buffer status report (BSR) to the base station 402 to receive a DG for transmitting a transport block (TB) over up to three sidelink transmission opportunities. When there is periodic traffic to be conveyed, the first sidelink UE 404 may request a CG by including a "trafficPeriodicity" parameter in the RRC message of "UEAssistanceInformation." The base station 402 may transmit the grant to the first sidelink UE 404 via a PDCCH or RRC signaling. Based on the grant, the first sidelink UE 404 may transmit sidelink messages to the second sidelink UE 406 via a PSCCH or a PSSCH. The second sidelink UE 406 may transmit the sidelink feedback to the first sidelink UE 404 via a physical sidelink feedback channel (PSFCH). Further, the first sidelink UE 404 may transmit a request for a grant for a retransmission (e.g., a feedback) to the base station 402 via a PUCCH.

Figure 5B:
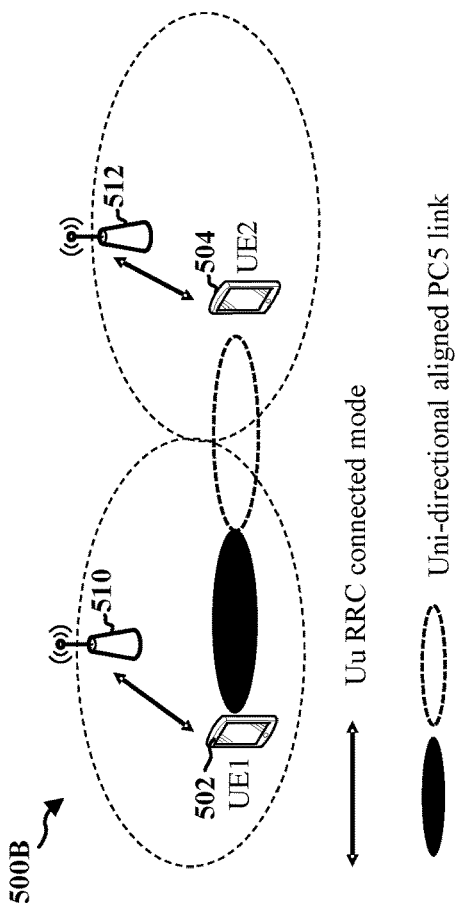
FIGS. 5A-D are diagrams illustrating example use cases of various aspects described herein.
Figure 5D:
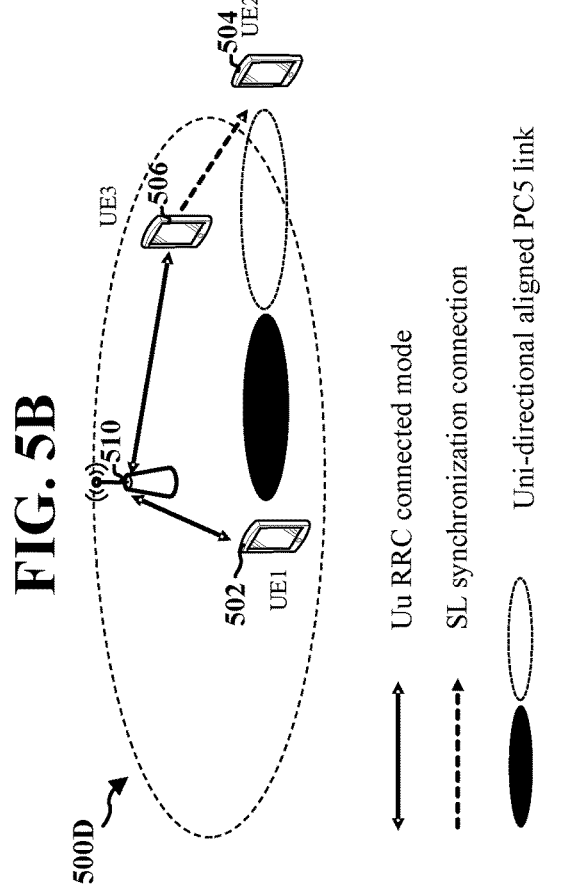
Figure 5A:
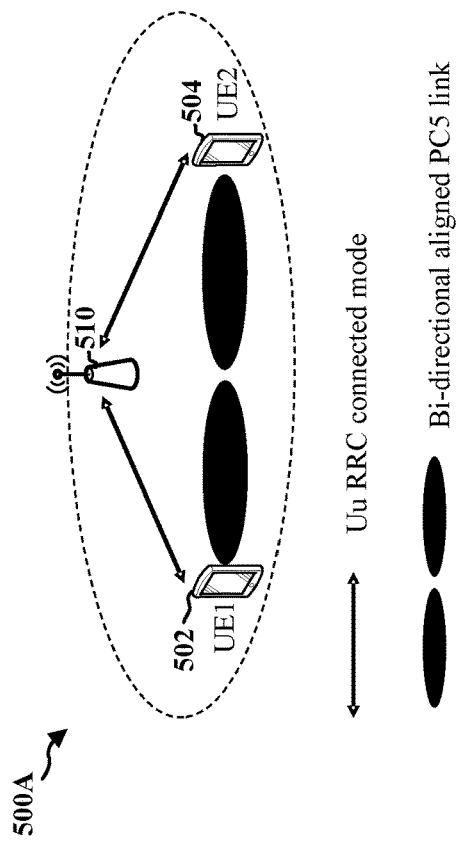

FIGS. 5A-5D are diagrams 500A-500D illustrating example use cases of various aspects described herein. In FIG. 5A, both the first UE 502 and the second UE 504 may be in the Uu RRC connected mode, and may be served by the same base station 510. The first UE 502 and the second UE 504 may attempt to establish a bi-directional beam-aligned sidelink connection (e.g., over a PC5 interface). In FIG. 5B, both the first UE 502 and the second UE 504 may be in the Uu RRC connected mode, but may be served by different base stations. In particular, the first UE 502 may be served by the first base station 510, and the second UE 504 may be served by the second base station 512. The two UEs may attempt to establish a uni-directional beam-aligned sidelink connection. In some configurations, the second UE 504 may obtain information from a SIB of the second base station 512 for receiving a sidelink transmission in mode 1 via one or more resources in the resource pool managed by the first base station 510.

Figure 5C:
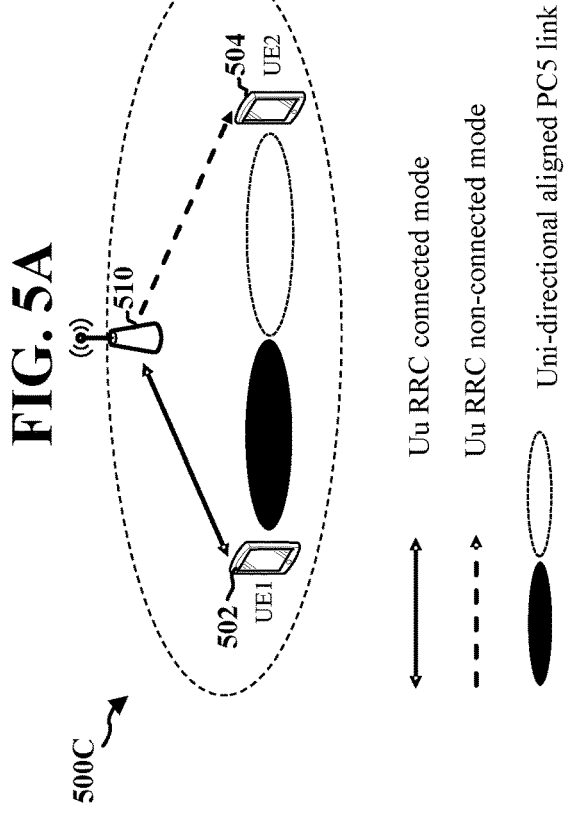

In FIG. 5C, the first UE 502 may be in a Uu RRC connected mode, while the second UE 504 may be in a Uu RRC non-connected mode. The two UEs may attempt to establish a uni-directional beam-aligned sidelink connection. In FIG. 5D, the first UE 502 may be in a Uu RRC connected mode, while the second UE 504 may be out of coverage (OoC). The two UEs may attempt to establish a uni-directional beam-aligned sidelink connection.

Figure 6A:
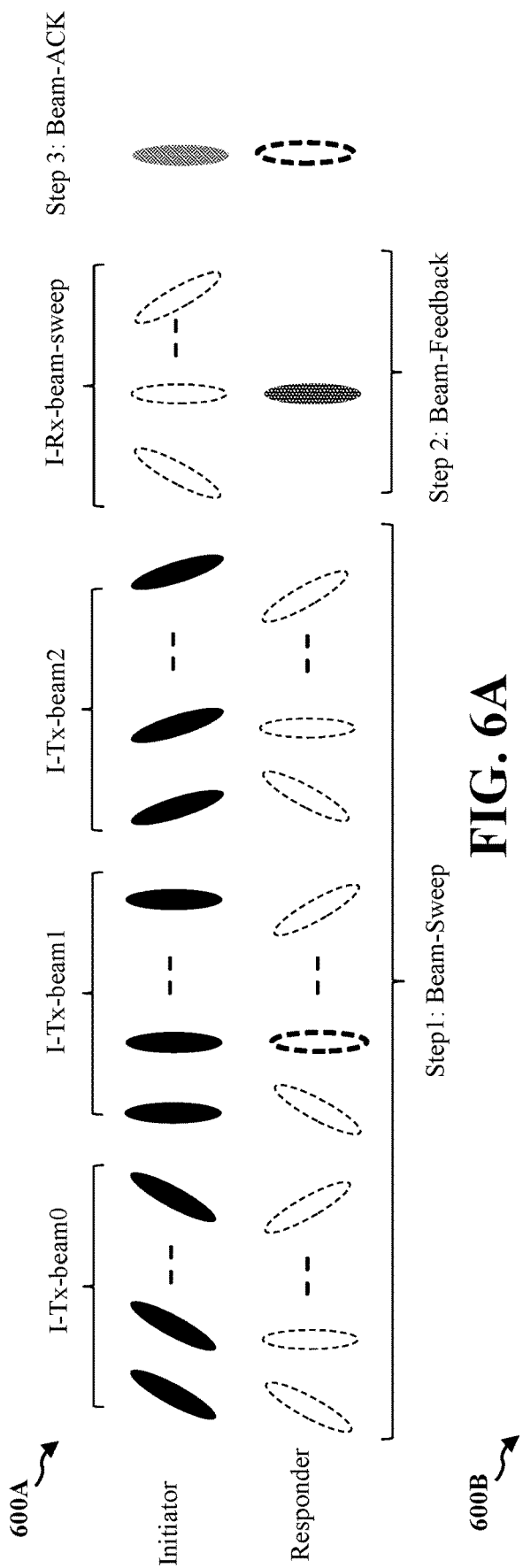
FIGS. 6A and 6B are diagrams illustrating an example beamforming alignment procedure.
Figure 6B:
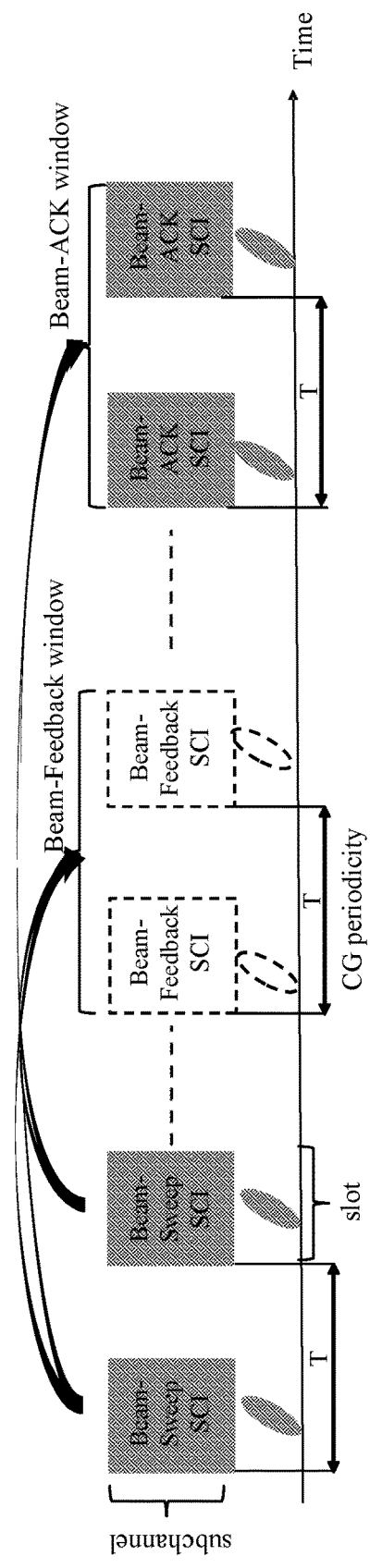

FIGS. 6A and 6B are diagrams 600A, 600B illustrating an example beamforming alignment procedure. As shown in FIG. 6A, the beamforming alignment procedure may be a three-step handshaking process. One of the sidelink UEs may be an initiator UE (which may hereinafter also be referred to as a first UE), and one or more other UEs may be (a) responder UE(s) (which may hereinafter also be referred to as (a) second UE(s)). In the first step, the initiator UE may sweep Tx beams while the responder UE may explore Rx beams. In particular, the initiator UE may sequentially sweep the Tx beam and the responder UE may sequentially sweep the Rx beam, such that all combinations of Tx beam-Rx beam pairs may be evaluated. In the second step, the responder UE may report the best (i.e., the strongest or the most suitable) beam pair(s) to the initiator UE. In the third step, the initiator UE may acknowledge the report received in the second step, thereby completing the procedure.

In particular, in the first step, the beamforming alignment initiator UE may transmit a train of messages over the sidelink connection. CG-based channel access may be more suitable as the limited number of transmissions associated with each DG (e.g., less than or equal to three) may be too small for this purpose. Additionally, in the first step, the responder UE may be aware of when and where the initiator UE may be transmitting. Compared to a DG, periodical resource allocation via a CG may reduce the signaling overhead.

In some configurations, report messages in the second step (which may be referred to as beam-feedback messages) and/or the acknowledgement message in the third step (which may be referred to as the beam-ACK message) may be delivered over an alternative, non-sidelink route if such an alternative route is available. However, delivering these messages over an alternative route may result in a non-trivial latency and/or a significant implementation cost. A sidelink-only solution for the three-step handshake process may be beneficial in all use cases described above.

Bi-directional (Tx and Rx) usage of the CG-based sidelink transmission under the control of the initiator UE may be utilized. The initiator UE may transmit a command to the responder UE. The command may be associated with the beam-feedback messages in the second step transmitted over a specified set of CG occasions.

Referring to FIG. 6B, the beamforming alignment initiator UE may be assigned a CG (e.g., a type 2 CG) for conducting the three-step beamforming handshaking process. The initiator UE may transmit a beam-sweep SCI message on a CG occasion. The beam-sweep SCI messages, each of which may be transmitted on a Tx beam, may include a Tx beam index, a pointer to an occasion (or a beam-feedback time window) to receive a beam-feedback SCI message from the responder UE, and another pointer to an occasion (or a beam-ACK time window) where the beam-ACK SCI message may be sent with the same Tx beam.

For initial beamforming alignment between a base station and a UE, beam sweeping may be conducted via periodic SSBs or CSI-RSs, beam feedback via the random access channel (RACH), and beam acknowledgement via a random access response (RAR). However, there may be neither periodic/dedicated CSI-RSs nor the RACH in the NR sidelink. Introducing new layer 1 channels and/or reference signals may be cumbersome. Existing layer 1 channels and reference signals may be leveraged for the sidelink beamforming alignment process.

Aspects described herein may be suitable for use cases where spectral efficiency is not a major concern. This may indeed be the case for deployment of the sidelink communication in unlicensed bands with plenty of bandwidth. For example, a bandwidth of approximately 1.8 GHz may be available in the 5 GHz/6 GHz band, and a bandwidth of approximately 7 GHz may be available in the 60 GHz band. The overhead may be reduced with an optimization on the implementation of the beam-sweep SCI message and the beam-feedback SCI message.

Figure 7:
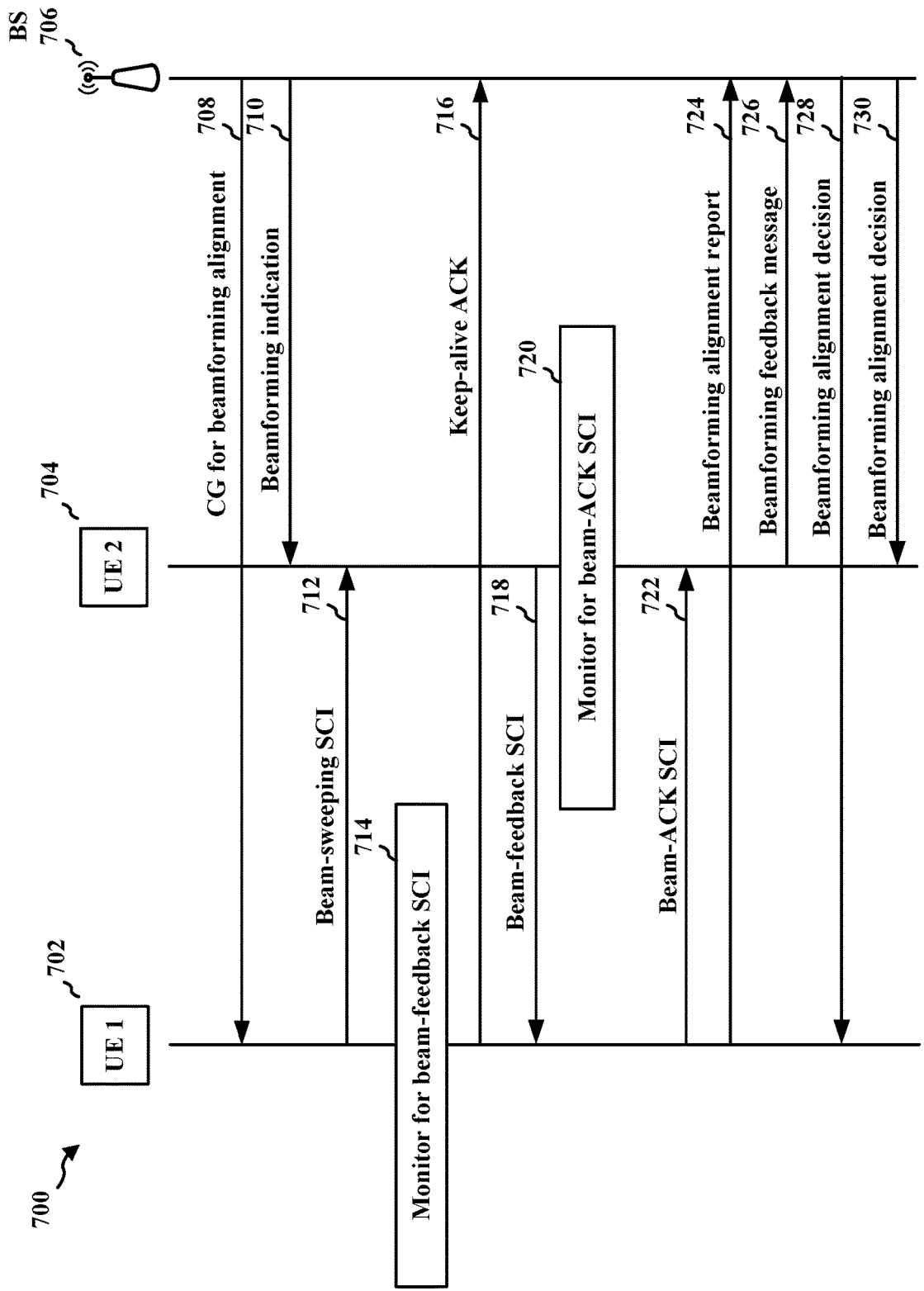
FIG. 7 is a diagram illustrating a communication flow of a method of wireless communication.

FIG. 7 is a diagram 700 illustrating a communication flow of a method of wireless communication. The first (sidelink) UE 702 may be an initiator UE, and the second (sidelink) UE 704 may be a responder UE. When operating in the NR sidelink communication mode 1, a first sidelink UE may be configured with a CG by the base station for conducting, as an initiator UE, a beamforming alignment procedure with a second sidelink UE. The radio resource allocation may follow the framework of type 1/type 2 CG. The CG for beamforming alignment may be associated with a duration. The duration may indicate a number of CG occasions. Accordingly, at 708, the first UE 702 may receive, from a base station 706, a CG indicating one or more CG resources for a beamforming alignment procedure.

The second sidelink UE may receive a beamforming alignment indication from either the first sidelink UE or from the base station. The beamforming alignment indication may relate to the CG resources allocated for the beamforming alignment procedure. In particular, the beamforming alignment indication may include the duration of the CG. Accordingly, at 710, the second UE 704 may receive, from a base station 706, a beamforming indication for the beamforming alignment procedure.

When the second UE is in the Uu RRC connected mode (e.g., in scenarios illustrated in FIGS. 5A and 5B), the second UE may receive the beamforming alignment indication from the serving base station via an RRC message, a media access control (MAC)-control element (CE) (MAC-CE), a DCI message, or a combination thereof. When the second UE and the first UE are served by different base stations (e.g., as illustrated in FIG. 5B), the Xn interface or core-network relaying may be utilized to first relay the information about the CG from the base station serving the first UE to the base station serving the second UE, before the beamforming alignment indication is transmitted from the base station serving the second UE to the second UE.

When the second UE is in the Uu RRC non-connected mode (e.g., as illustrated in FIG. 5C), the second UE may receive the beamforming alignment indication via a paging message in a paging procedure. In one configuration, when the size of the paging message is a concern, the second UE may first enter the Uu RRC connected mode (based on a paging process), and then may receive the beamforming alignment indication via an RRC message, a MAC-CE, a DCI message, or a combination thereof.

When the second UE is OoC (e.g., as illustrated in FIG. 5D), in one configuration, the second UE may receive the beamforming alignment indication from a third UE (e.g., the third UE 506) via a sidelink synchronization connection. In particular, the third UE may receive the beamforming alignment indication from the serving base station, and may relay the beamforming alignment indication to the second UE via the sidelink (SL)-remaining minimum system information (RMSI) (SL-RMSI) that is frequency division multiplexed (FDM'ed) with an SL-SSB to the second UE. In another configuration, when an un-aligned/low-rate sidelink connection exists from the first UE to the second UE, the OoC second UE may receive the beamforming alignment indication from a first UE via an SL MAC-CE, an SCI message, or a PC5 RRC message, via the un-aligned/low-rate sidelink connection. In another configuration, the beamforming alignment indication may be relayed from the first UE to the OoC second UE over un-aligned/low-rate sidelink connections over multiple hops (e.g., through a fourth UE (not shown)), via an SL MAC-CE or an SCI message. This approach may be utilized when multi-hop relaying (e.g., flooding) is supported.

On each CG resource the first UE may transmit over a Tx beam a beam-sweep SCI message. The beam-sweep SCI message may include a Tx beam index, a time window in which the first UE may search for the beam-feedback SCI message, and/or another time window including CG occasions in which the first UE may use the same beam to transmit a beam-ACK SCI message. In one configuration, a beam-ACK SCI message may be transmitted together with a beam-sweep SCI message. Accordingly, at 712, the first UE 702 may transmit, to at least one second UE 704 via one or more Tx beams on the one or more CG resources, beam-sweeping SCI for the beamforming alignment procedure.

At 714, the first UE 702 may monitor, over the time period, for beam-feedback SCI from the at least one second UE 704.

The second UE may perform Rx beam sweeping during the CG occasions to search for a beam-sweep SCI message and identify the best (the most suitable) Rx beam for each Tx beam based on the reference signal received power (RSRP) of the demodulation reference signal (DMRS). The second UE may transmit a beam-feedback SCI message to the first UE within the beam-feedback time window specified by the first UE in the beam-sweep SCI message. The beam-feedback SCI message may include the index of the best (most suitable) Tx beam on which a beam-sweep SCI message was transmitted, the index of the best (most suitable) Rx beam corresponding to the best (most suitable) Tx beam, and/or a link metric associated with the Tx beam-Rx beam pair (e.g., the RSRP of the DMRS, or any other signal to interference plus noise ratio "SINR"-based metric such as a received signal strength indicator "RSSI," a reference signal received quality "RSRQ," a signal to noise ratio "SNR," or an SINR, etc.). Accordingly, at 718, the first UE 702 may receive, from the at least one second UE 704, the beam-feedback SCI within the time period.

In one configuration, the beam-feedback time window indicated in the beam-sweep SCI message may include several CG occasions. The initiator UE may redistribute the CG received from the base station to the responder UE, so the responder UE may transmit the beam-feedback SCI message during the CG occasions in the beam-feedback time window.

In one configuration, the beam-feedback time window may indicate beamformed reception over a mode 2 resource pool within the beam-feedback time window. The responder UE may compete for access to one or more resources in the mode 2 resource pool to transmit the beam-feedback SCI message.

In one configuration, the beam-feedback time window may indicate beamformed reception over a same mode 1 resource pool. Accordingly, after detecting valid beam-sweep SCI messages, the responder UE may transmit an SR to the base station to request DG-based resources in order to transmit the beam-feedback SCI message. The base station may transmit an indication of the PUCCH resource for transmitting the SR to the responder UE together with the beamforming alignment indication.

In one configuration, the sidelink system may support the multiple-bit PSFCH. The responder UE may transmit the beam-feedback SCI message by utilising or repurposing some of the bits of the multiple-bit PSFCH resource associated with the PSSCH carrying the beam-sweep SCI message.

After transmitting the beam-feedback SCI, the second UE may search for the beam-ACK SCI message during the CG occasions within the beam-ACK time window. Accordingly, at 720, the second UE 704 may monitor, over the one or more CG resources, for beam-ACK SCI based on the transmitted beam-feedback SCI.

At 722, the first UE 702 may transmit, to the at least one second UE 704 via the one or more CG resources, the beam-ACK SCI based on the received beam-feedback SCI. The first UE may include in the beam-ACK SCI message the index of the Rx beam indicated in the beam-feedback SCI message transmitted by the second UE, a link metric (e.g., the RSRP of the DMRS, an RSRQ, an RSSI, an SNR, or an SINR, etc.), and/or a "done" bit to complete the beamforming alignment procedure.

The first UE may count the number of CG occasions from the activation of the CG. The first UE may then transmit the counter value in the beam-sweep SCI message and/or the beam-ACK SCI message to synchronize with the second UE. The CG may expire when the first UE has used the configured number of CG occasions according to the duration of the CG. CG occasions that are redistributed by the first UE to the second UE for the transmission of the beam-feedback SCI message may also be counted as used.

In one configuration, the first UE may be configured with one or more PUCCH resources. The first UE may transmit heart-beating ACK(s) via the PUCCH to the base station to maintain (keep) the CG for beamforming alignment. Accordingly, at 716, the first UE 702 may transmit, to the base station 706, at least one ACK message via the at least one PUCCH resource to maintain at least some of the one or more CG resources. The first UE may early-release the CG by transmitting a predetermined number of consecutive NACKs to the base station. For example, when a satisfactory SINR has been achieved through the beamforming alignment process earlier than the expected duration is up, the first UE may early-release the CG.

In one configuration, the initiator UE may be informed of a set of beamforming alignment responder UEs. When more than one responder UEs are present, the beam-sweep SCI message transmitted by the initiator UE may include respective beam-feedback time windows and respective beam- ACK time windows for the different responder UEs. The first UE may transmit the beam-sweep SCI message in a groupcast or a broadcast. Accordingly, one CG may be used for beamforming alignment with multiple responder UEs.

The second UE may be informed of an identifier (ID) of the initiator via the beamforming alignment indication. The second UE may confirm whether it is conducting a beamforming alignment procedure with the proper initiator ID based on the ID of the initiator. This may be useful when the CG resources are spatially reused by other UEs, especially if the other UEs used the same resources for beamforming alignment. Accordingly, the beam-sweep SCI message and the beam-ACK SCI message may include the remaining 16 bits of the layer 2 ID.

In one configuration, the base station may issue a degenerated CG. The beam-sweep SCI message and the beam-feedback SCI message may be transmitted based on the CG. The beam-ACK SCI message may not be transmitted based on the CG. In particular, the beam-sweep SCI message may include a null or invalid beam-ACK time window. Therefore, after receiving the beam-feedback SCI message, the first UE may transmit a beamforming report to the base station via a MAC-CE or an RRC message. Accordingly, at 724, the first UE 702 may transmit, to the base station 706, a beamforming alignment report based on the received beam-feedback SCI. The base station may then make a beamforming alignment decision based on the beamforming report, and may inform the first UE and the second UE of the beamforming alignment decision via a MAC-CE or an RRC message. Accordingly, at 728, the first UE 702 may receive, from the base station 706, a beamforming alignment decision based on the beamforming alignment report. At 730, the second UE 704 may receive, from a base station 706, a beamforming alignment decision based on the beamforming alignment report.

In one configuration, the beam-sweep SCI message may be transmitted based on the CG. The beam-feedback SCI message and the beam-ACK SCI message may not be transmitted based on the CG. In particular, the beam-sweep SCI message may include a null or invalid beam-feedback time window and a null or invalid beam-ACK time window. Accordingly, after receiving the beam-sweep SCI message and determining the best (the strongest, the most suitable) beam pair, the second UE may transmit a beamforming feedback message, which may include the same information that would have been included in the beam-feedback SCI message, to the base station via a MAC-CE or an RRC message. Accordingly, at 726, the second UE 704 may transmit, to the base station 706, a beamforming feedback message based on the received beam-sweep SCI. The base station may then make a beamforming alignment decision based on the beamforming feedback message, and may inform the first UE and the second UE of the beamforming alignment decision via a MAC-CE or an RRC message. Accordingly, at 728, the first UE 702 may receive, from the base station 706, a beamforming alignment decision based on the beamforming feedback message. At 730, the second UE 704 may receive, from a base station 706, a beamforming alignment decision based on the beamforming feedback message.

In one configuration, the first UE may transmit an enhanced SL-SSB in place of the beam-sweep SCI. The SL-SSB may be enhanced with new entries for the beam-feedback time window and the beam-ACK time window.

In one configuration, to improve the spectral efficiency of the beam-sweep SCI message, information and/or reference signals for more than one beams may be included with each transmission. For example, DMRSs may be transmitted over multiple, different beams. The SCI may be modulated and encoded with a lowest modulation and coding scheme (MCS). In one configuration, a beamformed sidelink CSI-RS (S-CSI-RS) on another beam may be transmitted with the beam-sweeping SCI message.

In one configuration, instead of using the SCI message in layer 1, the beam-sweeping information may be carried over layer 2 and/or layer 3. No HAQR or ARQ may be present on the control payload. The beam-feedback information (that otherwise would have been transmitted in the beam-feedback SCI message) and the beam-ACK (that otherwise would have been transmitted in the beam-ACK SCI message) may similarly be carrier over layer 2 and/or layer 3.

Figure 8:
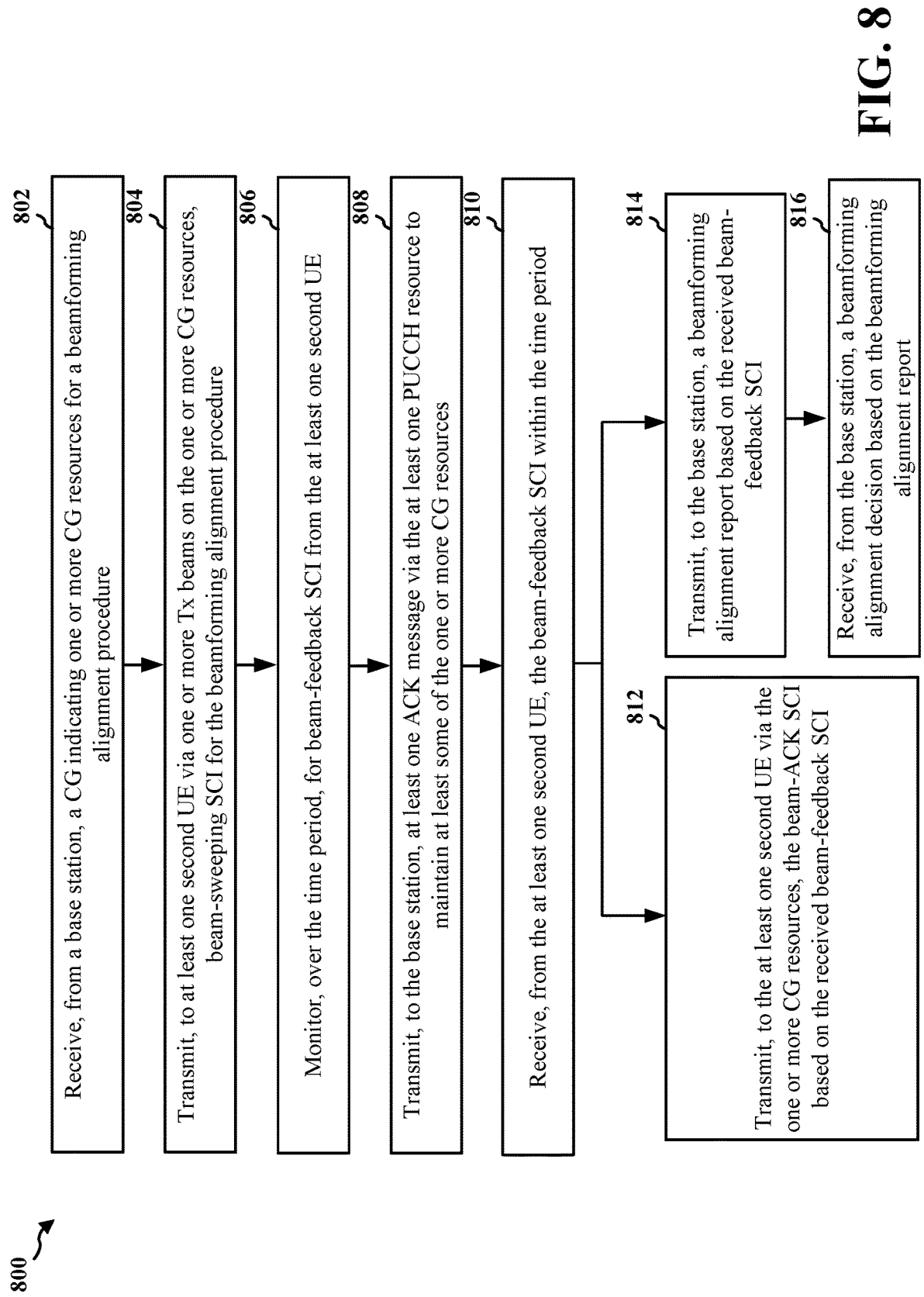
FIG. 8 is a flowchart of a method of wireless communication.

FIG. 8 is a flowchart 800 of a method of wireless communication. The method may be performed by an initiator/first UE (e.g., the UE 104/350; the first UE 702; the apparatus 1002). At 802, the first UE may receive, from a base station, a CG indicating one or more CG resources for a beamforming alignment procedure. For example, 802 may be performed by the beamforming alignment component 1040 in FIG. 10. Referring to FIG. 7, at 708, the first UE 702 may receive, from a base station 706, a CG indicating one or more CG resources for a beamforming alignment procedure.

At 804, the first UE may transmit, to at least one second UE via one or more Tx beams on the one or more CG resources, beam-sweeping SCI for the beamforming alignment procedure. The beam-sweeping SCI may include at least one of: a Tx beam index, a time period to monitor for beam-feedback SCI, or a time window including CG occasions for a same beam transmission of beam-ACK SCI. For example, 804 may be performed by the beamforming alignment component 1040 in FIG. 10. Referring to FIG. 7, at 712, the first UE 702 may transmit, to at least one second UE 704 via one or more Tx beams on the one or more CG resources, beam-sweeping SCI for the beamforming alignment procedure.

At 806, the first UE may monitor, over the time period, for beam-feedback SCI from the at least one second UE. For example, 806 may be performed by the beamforming alignment component 1040 in FIG. 10. Referring to FIG. 7, at 714, the first UE 702 may monitor, over the time period, for beam-feedback SCI from the at least one second UE 704.

In one configuration, the beamforming alignment procedure may correspond to sidelink mode 1.

In one configuration, at 810, the first UE may receive, from the at least one second UE, the beam-feedback SCI within the time period. For example, 810 may be performed by the beamforming alignment component 1040 in FIG. 10. Referring to FIG. 7, at 718, the first UE 702 may receive, from the at least one second UE 704, the beam-feedback SCI within the time period.

In one configuration, at 812, the first UE may transmit, to the at least one second UE via the one or more CG resources, the beam-ACK SCI based on the received beam-feedback SCI. For example, 812 may be performed by the beamforming alignment component 1040 in FIG. 10. Referring to FIG. 7, at 722, the first UE 702 may transmit, to the at least one second UE 704 via the one or more CG resources, the beam-ACK SCI based on the received beam-feedback SCI.

In one configuration, the beam-feedback SCI may include at least one of: an indication of a best Tx beam on which the beam-sweeping SCI was transmitted, an indication of a best Rx beam on which the beam-sweeping SCI was received, or a link quality metric.

In one configuration, the beam-sweeping SCI may specify at least one resource for transmission of the beam-feedback SCI. The first UE may receive, at 810, from the at least one second UE, the beam-feedback SCI via the specified at least one resource.

In one configuration, the first UE may receive, at 810, from the at least one second UE, the beam-feedback SCI via at least one PSFCH resource corresponding to a PSSCH via which the beam-sweeping SCI is transmitted.

In one configuration, the beam-ACK SCI may include at least one of: an indication of an Rx beam, a link quality metric, or an indication of a completion of the beamforming alignment procedure.

In one configuration, the one or more CG resources may correspond to a CG duration including a specified number of CG occasions, and the beam-sweeping SCI and the beam-ACK SCI may each be associated with a respective counter value corresponding to one CG occasion of the specified number of CG occasions.

In one configuration, the first UE may be configured by the base station with at least one PUCCH resource. At 808, the first UE may transmit, to the base station, at least one ACK message via the at least one PUCCH resource to maintain at least some of the one or more CG resources. For example, 808 may be performed by the beamforming alignment component 1040 in FIG. 10. Referring to FIG. 7, at 716, the first UE 702 may transmit, to the base station 706, at least one ACK message via the at least one PUCCH resource to maintain at least some of the one or more CG resources.

In one configuration, the at least one second UE may include a plurality of second UEs, and the beam-sweeping SCI may be transmitted via groupcast or broadcast.

In one configuration, the beam-sweeping SCI may not include a valid time window for the transmission of the beam-ACK SCI. At 814, the first UE may transmit, to the base station, a beamforming alignment report based on the received beam-feedback SCI. For example, 814 may be performed by the beamforming alignment component 1040 in FIG. 10. Referring to FIG. 7, at 724, the first UE 702 may transmit, to the base station 706, a beamforming alignment report based on the received beam-feedback SCI. At 816, the first UE may receive, from the base station, a beamforming alignment decision based on the beamforming alignment report. For example, 816 may be performed by the beamforming alignment component 1040 in FIG. 10. Referring to FIG. 7, at 728, the first UE 702 may receive, from the base station 706, a beamforming alignment decision based on the beamforming alignment report.

In one configuration, the one or more Tx beams may be associated with a plurality of Tx beams, and the beam-sweeping SCI may be associated with a plurality of DMRSs transmitted via two or more of the plurality of Tx beams.

In one configuration, the beam-sweeping SCI may be associated with a lowest MCS.

Figure 9:
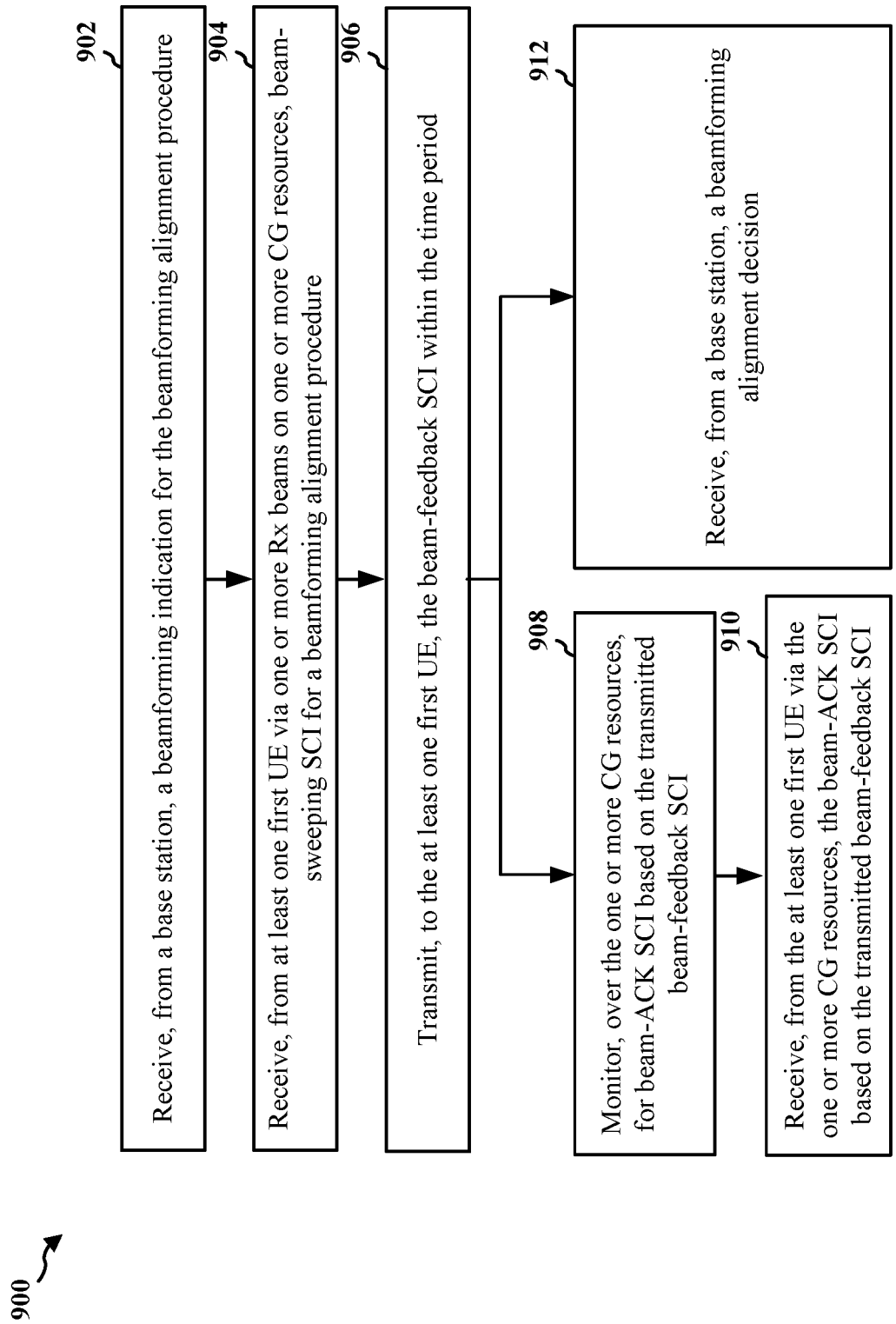
FIG. 9 is a flowchart of a method of wireless communication.

FIG. 9 is a flowchart 900 of a method of wireless communication. The method may be performed by a responder/second UE (e.g., the UE 104/350; the second UE 704, the apparatus 1102). At 904, the second UE may receive, from at least one first UE via one or more Rx beams on one or more CG resources, beam-sweeping SCI for a beamforming alignment procedure. The beam-sweeping SCI may include at least one of: a Tx beam index, a time period for monitoring for beam-feedback SCI, or a time window including CG occasions for a same beam transmission of beam-ACK SCI. For example, 904 may be performed by the beamforming alignment component 1140 in FIG. 11. Referring to FIG. 7, at 712, the second UE 704 may receive, from at least one first UE 702 via one or more Rx beams on one or more CG resources, beam-sweeping SCI for a beamforming alignment procedure.

At 906, the second UE may transmit, to the at least one first UE, the beam-feedback SCI within the time period. For example, 906 may be performed by the beamforming alignment component 1140 in FIG. 11. Referring to FIG. 7, at 718, the second UE 704 may transmit, to the at least one first UE 702, the beam-feedback SCI within the time period.

At 908, the second UE may monitor, over the one or more CG resources, for beam-ACK SCI based on the transmitted beam-feedback SCI. For example, 908 may be performed by the beamforming alignment component 1140 in FIG. 11. Referring to FIG. 7, at 720, the second UE 704 may monitor, over the one or more CG resources, for beam-ACK SCI based on the transmitted beam-feedback SCI.

In one configuration, at 902, the second UE may receive, from a base station, a beamforming indication for the beamforming alignment procedure. For example, 902 may be performed by the beamforming alignment component 1140 in FIG. 11. Referring to FIG. 7, at 710, the second UE 704 may receive, from a base station 706, a beamforming indication for the beamforming alignment procedure.

In one configuration, the reception of the beam-sweeping SCI on the one or more CG resources may be in response to the beamforming indication received from the base station.

In one configuration, the beamforming indication may include an identifier of the at least one first UE.

In one configuration, the beamforming alignment procedure may correspond to sidelink mode 1.

In one configuration, at 910, the second UE may receive, from the at least one first UE via the one or more CG resources, the beam-ACK SCI based on the transmitted beam-feedback SCI. For example, 910 may be performed by the beamforming alignment component 1140 in FIG. 11. Referring to FIG. 7, at 722, the second UE 704 may receive, from the at least one first UE 702 via the one or more CG resources, the beam-ACK SCI based on the transmitted beam-feedback SCI.

In one configuration, the beam-feedback SCI may include at least one of: an indication of a best Tx beam on which the beam-sweeping SCI was transmitted, an indication of a best Rx beam on which the beam-sweeping SCI was received, or a link quality metric.

In one configuration, the beam-sweeping SCI may specify at least one resource for transmission of the beam-feedback SCI. The second UE may transmit, at 906, to the at least one first UE, the beam-feedback SCI via the specified at least one resource.

In one configuration, the second UE may transmit, at 906, to the at least one first UE, the beam-feedback SCI via at least one PSFCH resource corresponding to a PSSCH via which the beam-sweeping SCI is transmitted.

In one configuration, the beam-ACK SCI may include at least one of: an indication of an Rx beam, a link quality metric, or an indication of a completion of the beamforming alignment procedure.

In one configuration, the one or more CG resources may correspond to a CG duration including a specified number of CG occasions, and the beam-sweeping SCI and the beam-ACK SCI may each be associated with a respective counter value corresponding to one CG occasion of the specified number of CG occasions.

In one configuration, the beam-sweeping SCI may not include a valid time window for the transmission of the beam-ACK SCI. At 912, the second UE may receive, from a base station, a beamforming alignment decision, the beamforming alignment decision being based on a beamforming alignment report. For example, 912 may be performed by the beamforming alignment component 1140 in FIG. 11. Referring to FIG. 7, at 730, the second UE 704 may receive, from a base station 706, a beamforming alignment decision.

In one configuration, the one or more Tx beams may be associated with a plurality of Tx beams, and the beam-sweeping SCI may be associated with a plurality of DMRSs via two or more of the plurality of Tx beams.

In one configuration, the beam-sweeping SCI may be associated with a lowest MCS.

Figure 10:
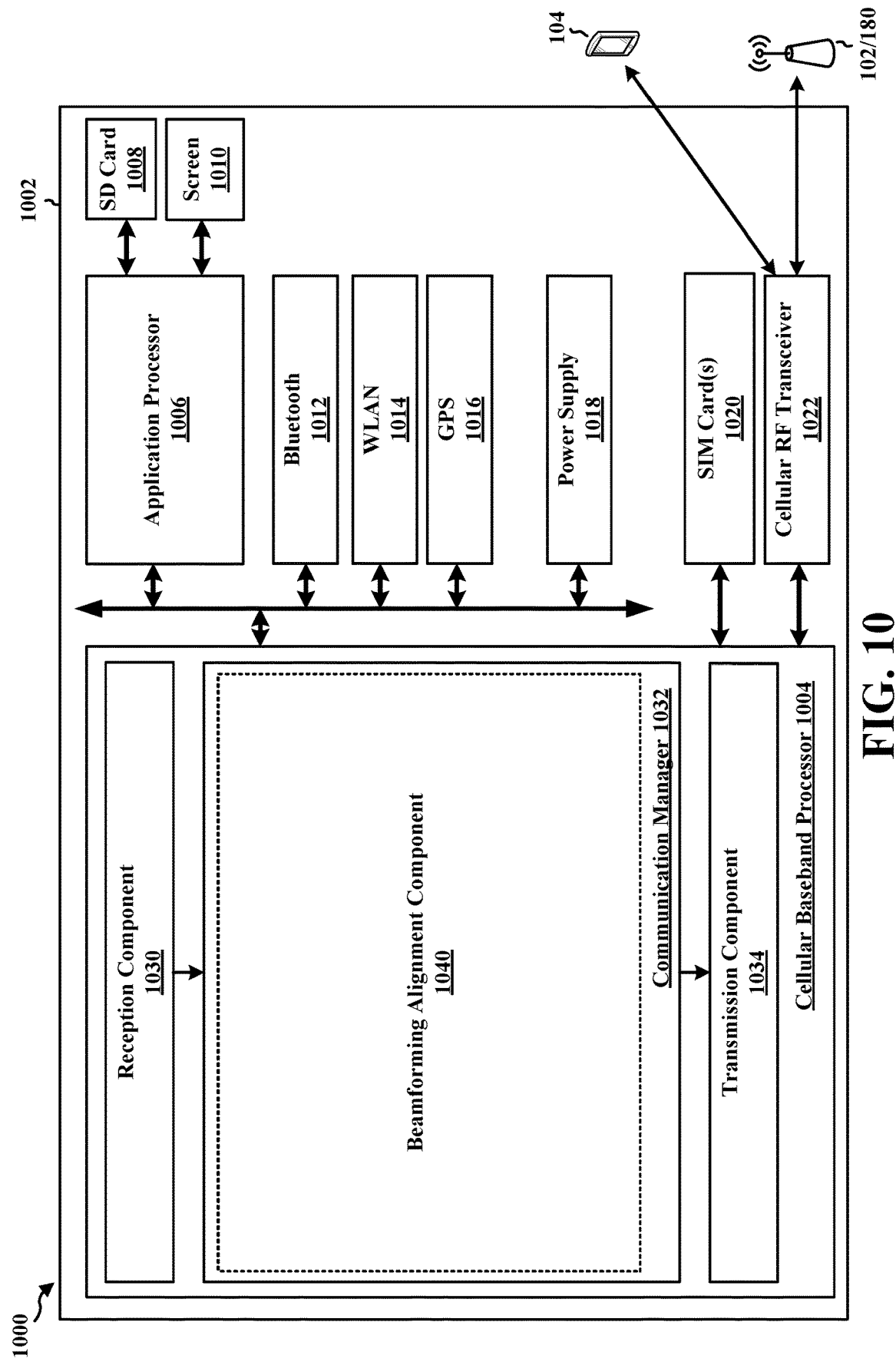
FIG. 10 is a diagram illustrating an example of a hardware implementation for an example apparatus.

FIG. 10 is a diagram 1000 illustrating an example of a hardware implementation for an apparatus 1002. The apparatus 1002 is an initiator/first UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a beamforming alignment component 1040 that may be configured to receive, from a base station, a CG indicating one or more CG resources for a beamforming alignment procedure, e.g., as described in connection with 802 in FIG. 8. The beamforming alignment component 1040 may be configured to transmit, to at least one second UE via one or more Tx beams on the one or more CG resources, beam-sweeping SCI for the beamforming alignment procedure, e.g., as described in connection with 804 in FIG. 8. The beamforming alignment component 1040 may be configured to monitor, over the time period, for beam-feedback SCI from the at least one second UE, e.g., as described in connection with 806 in FIG. 8. The beamforming alignment component 1040 may be configured to transmit, to the base station, at least one ACK message via the at least one PUCCH resource to maintain at least some of the one or more CG resources, e.g., as described in connection with 808 in FIG. 8. The beamforming alignment component 1040 may be configured to receive, from the at least one second UE, the beam-feedback SCI within the time period, e.g., as described in connection with 810 in FIG. 8. The beamforming alignment component 1040 may be configured to transmit, to the at least one second UE via the one or more CG resources, the beam-ACK SCI based on the received beam-feedback SCI, e.g., as described in connection with 812 in FIG. 8. The beamforming alignment component 1040 may be configured to transmit, to the base station, a beamforming alignment report based on the received beam-feedback SCI, e.g., as described in connection with 814 in FIG. 8. The beamforming alignment component 1040 may be configured to receive, from the base station, a beamforming alignment decision based on the beamforming alignment report, e.g., as described in connection with 816 in FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a CG indicating one or more CG resources for a beamforming alignment procedure. The apparatus 1002 may include means for transmitting, to at least one second UE via one or more Tx beams on the one or more CG resources, beam-sweeping SCI for the beamforming alignment procedure. The beam-sweeping SCI may include at least one of: a Tx beam index, a time period to monitor for beam-feedback SCI, or a time window including CG occasions for a same beam transmission of beam-ACK SCI. The apparatus 1002 may include means for monitoring, over the time period, for beam-feedback SCI from the at least one second UE.

In one configuration, the beamforming alignment procedure may correspond to sidelink mode 1. In one configuration, the apparatus 1002 may include means for receiving, from the at least one second UE, the beam-feedback SCI within the time period. In one configuration, the apparatus 1002 may include means for transmitting, to the at least one second UE via the one or more CG resources, the beam-ACK SCI based on the received beam-feedback SCI. In one configuration, the beam-feedback SCI may include at least one of: an indication of a best Tx beam on which the beam-sweeping SCI was transmitted, an indication of a best Rx beam on which the beam-sweeping SCI was received, or a link quality metric. In one configuration, the beam-sweeping SCI may specify at least one resource for transmission of the beam-feedback SCI. The apparatus 1002 may include means for receiving, from the at least one second UE, the beam-feedback SCI via the specified at least one resource. In one configuration, the apparatus 1002 may include means for receiving, from the at least one second UE, the beam-feedback SCI via at least one PSFCH resource corresponding to a PSSCH via which the beam-sweeping SCI is transmitted. In one configuration, the beam-ACK SCI may include at least one of: an indication of an Rx beam, a link quality metric, or an indication of a completion of the beamforming alignment procedure. In one configuration, the one or more CG resources may correspond to a CG duration including a specified number of CG occasions, and the beam-sweeping SCI and the beam-ACK SCI may each be associated with a respective counter value corresponding to one CG occasion of the specified number of CG occasions. In one configuration, the first UE may be configured by the base station with at least one PUCCH resource. The apparatus 1002 may include means for transmitting, to the base station, at least one ACK message via the at least one PUCCH resource to maintain at least some of the one or more CG resources. In one configuration, the at least one second UE may include a plurality of second UEs, and the beam-sweeping SCI may be transmitted via groupcast or broadcast. In one configuration, the beam-sweeping SCI may not include a valid time window for the transmission of the beam-ACK SCI. The apparatus 1002 may include means for transmitting, to the base station, a beamforming alignment report based on the received beam-feedback SCI. The apparatus 1002 may include means for receiving, from the base station, a beamforming alignment decision based on the beamforming alignment report. In one configuration, the one or more Tx beams may be associated with a plurality of Tx beams, and the beam-sweeping SCI may be associated with a plurality of DMRSs transmitted via two or more of the plurality of Tx beams. In one configuration, the beam-sweeping SCI may be associated with a lowest MCS.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
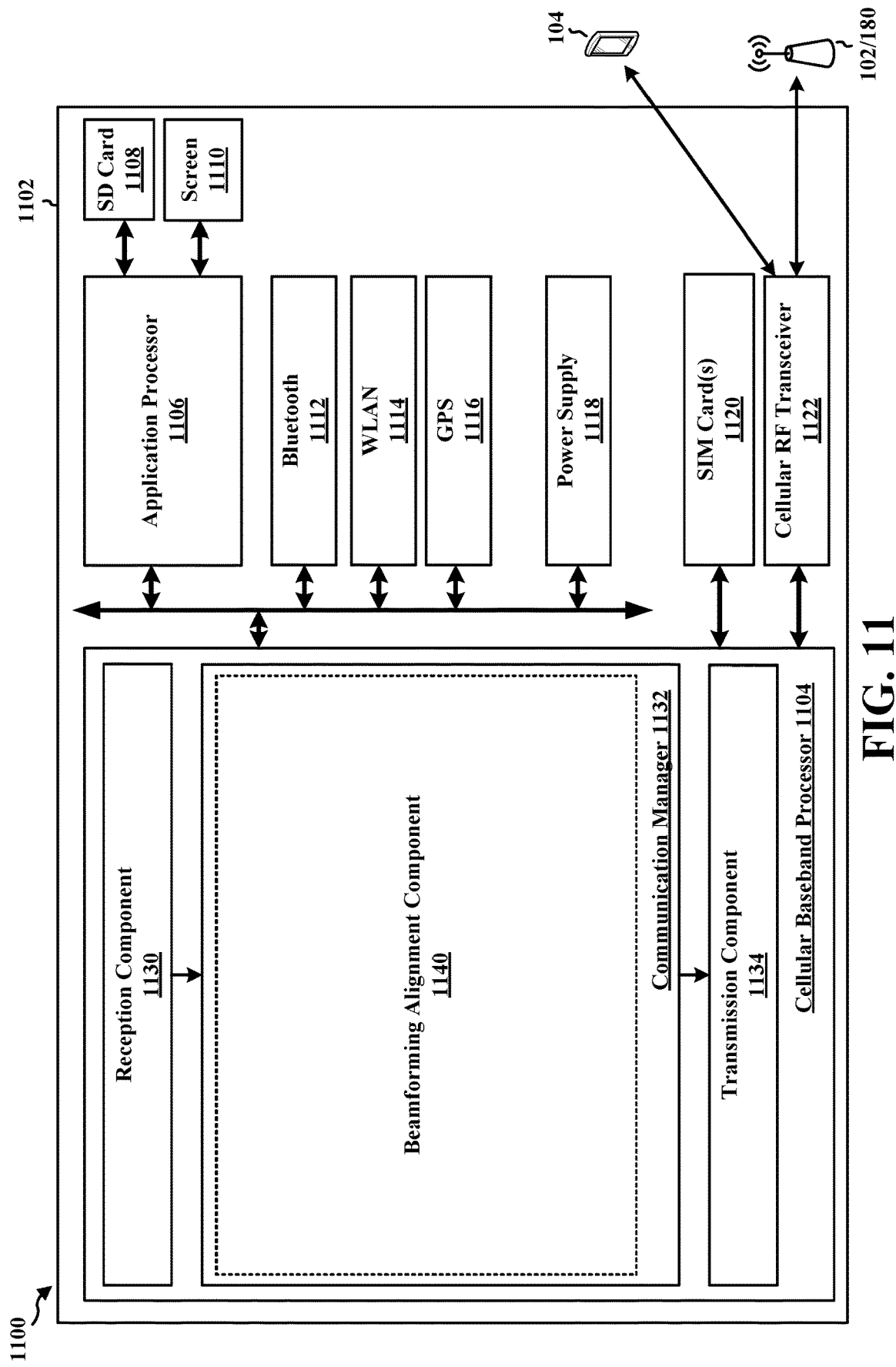
FIG. 11 is a diagram illustrating an example of a hardware implementation for an example apparatus.

FIG. 11 is a diagram 1100 illustrating an example of a hardware implementation for an apparatus 1102. The apparatus 1102 is a responder/second UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a beamforming alignment component 1140 that may be configured to receive, from abase station, a beamforming indication for the beamforming alignment procedure, e.g., as described in connection with 902 in FIG. 9. The beamforming alignment component 1140 may be configured to receive, from at least one first UE via one or more Rx beams on one or more CG resources, beam-sweeping SCI for a beamforming alignment procedure, e.g., as described in connection with 904 in FIG. 9. The beamforming alignment component 1140 may be configured to transmit, to the at least one first UE, the beam-feedback SCI within the time period, e.g., as described in connection with 906 in FIG. 9. The beamforming alignment component 1140 may be configured to monitor, over the one or more CG resources, for beam-ACK SCI based on the transmitted beam-feedback SCI, e.g., as described in connection with 908 in FIG. 9. The beamforming alignment component 1140 may be configured to receive, from the at least one first UE via the one or more CG resources, the beam-ACK SCI based on the transmitted beam-feedback SCI, e.g., as described in connection with 910 in FIG. 9. The beamforming alignment component 1140 may be configured to receive, from a base station, a beamforming alignment decision, the beamforming alignment decision being based on a beamforming alignment report, e.g., as described in connection with 912 in FIG. 9.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from at least one first UE via one or more Rx beams on one or more CG resources, beam-sweeping SCI for a beamforming alignment procedure. The beam-sweeping SCI may include at least one of: a Tx beam index, a time period for monitoring for beam-feedback SCI, or a time window including CG occasions for a same beam transmission of beam-ACK SCI. The apparatus 1102 may include means for transmitting, to the at least one first UE, the beam-feedback SCI within the time period. The apparatus 1102 may include means for monitoring, over the one or more CG resources, for beam-ACK SCI based on the transmitted beam-feedback SCI.

In one configuration, the apparatus 1102 may include means for receiving, from a base station, a beamforming indication for the beamforming alignment procedure. In one configuration, the reception of the beam-sweeping SCI on the one or more CG resources may be in response to the beamforming indication received from the base station. In one configuration, the beamforming indication may include an identifier of the at least one first UE. In one configuration, the beamforming alignment procedure may correspond to sidelink mode 1. In one configuration, the apparatus 1102 may include means for receiving, from the at least one first UE via the one or more CG resources, the beam-ACK SCI based on the transmitted beam-feedback SCI. In one configuration, the beam-feedback SCI may include at least one of: an indication of a best Tx beam on which the beam-sweeping SCI was transmitted, an indication of a best Rx beam on which the beam-sweeping SCI was received, or a link quality metric. In one configuration, the beam-sweeping SCI may specify at least one resource for transmission of the beam-feedback SCI. The apparatus 1102 may include means for transmitting, to the at least one first UE, the beam-feedback SCI via the specified at least one resource. In one configuration, the apparatus 1102 may include means for transmitting, to the at least one first UE, the beam-feedback SCI via at least one PSFCH resource corresponding to a PSSCH via which the beam-sweeping SCI is transmitted. In one configuration, the beam-ACK SCI may include at least one of: an indication of an Rx beam, a link quality metric, or an indication of a completion of the beamforming alignment procedure. In one configuration, the one or more CG resources may correspond to a CG duration including a specified number of CG occasions, and the beam-sweeping SCI and the beam-ACK SCI may each be associated with a respective counter value corresponding to one CG occasion of the specified number of CG occasions. In one configuration, the beam-sweeping SCI may not include a valid time window for the transmission of the beam-ACK SCI. The apparatus 1102 may include means for receiving, from a base station, a beamforming alignment decision, the beamforming alignment decision being based on a beamforming alignment report. In one configuration, the one or more Tx beams may be associated with a plurality of Tx beams, and the beam-sweeping SCI may be associated with a plurality of DMRSs via two or more of the plurality of Tx beams. In one configuration, the beam-sweeping SCI may be associated with a lowest MCS.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects described above may relate to a CG-based sidelink beamforming alignment procedure. The initiator UE may receive, from a base station, a CG indicating one or more CG resources for a beamforming alignment procedure. The initiator UE may transmit, to at least one responder UE via one or more Tx beams on the one or more CG resources, beam-sweeping SCI for the beamforming alignment procedure. The beam-sweeping SCI may include at least one of: a Tx beam index, a time period to monitor for beam-feedback SCI, or a time window including CG occasions for a same beam transmission of ACK SCI. The initiator UE may monitor, over the time period, for beam-feedback SCI from the at least one responder UE. The initiator UE may receive, from the at least one responder UE, the beam-feedback SCI within the time period. The initiator UE may transmit, to the at least one responder UE via the one or more CG resources, the beam-ACK SCI based on the received beam-feedback SCI. Accordingly, a CG-based three-step sidelink beamforming alignment procedure may be performed between an initiator UE and at least one responder UE in the sidelink mode 1 without extensive involvement of the base station and without excessive resource usage. Existing channels and reference signals may be leveraged for the three-step handshaking process. The sidelink beamforming alignment may be advantageous with the deployment of the NR sidelink communication in the unlicensed higher frequency bands.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first UE, including: receiving, from a base station, a CG indicating one or more CG resources for a beamforming alignment procedure; transmitting, to at least one second UE via one or more Tx beams on the one or more CG resources, beam-sweeping SCI for the beamforming alignment procedure, the beam-sweeping SCI including at least one of: a Tx beam index, a time period to monitor for beam-feedback SCI, or a time window including CG occasions for a same beam transmission of beam-ACK SCI; and monitoring, over the time period, for beam-feedback SCI from the at least one second UE.

Aspect 2 is the method of aspect 1, where the beamforming alignment procedure corresponds to sidelink mode 1.

Aspect 3 is the method of any of aspects 1 and 2, further including: receiving, from the at least one second UE, the beam-feedback SCI within the time period.

Aspect 4 is the method of aspect 3, further including: transmitting, to the at least one second UE via the one or more CG resources, the beam-ACK SCI based on the received beam-feedback SCI.

Aspect 5 is the method of any of aspects 1 to 4, where the beam-feedback SCI include s at least one of: an indication of a best Tx beam on which the beam-sweeping SCI was transmitted, an indication of a best Rx beam on which the beam-sweeping SCI was received, or a link quality metric.

Aspect 6 is the method of any of aspects 1 to 5, where the beam-sweeping SCI specifies at least one resource for transmission of the beam-feedback SCI, the method further including: receiving, from the at least one second UE, the beam-feedback SCI via the specified at least one resource.

Aspect 7 is the method of any of aspects 1 to 5, further including: receiving, from the at least one second UE, the beam-feedback SCI via at least one PSFCH resource corresponding to a PSSCH via which the beam-sweeping SCI is transmitted.

Aspect 8 is the method of any of aspects 1 to 7, where the beam-ACK SCI includes at least one of: an indication of an Rx beam, a link quality metric, or an indication of a completion of the beamforming alignment procedure.

Aspect 9 is the method of any of aspects 1 to 8, where the one or more CG resources correspond to a CG duration including a specified number of CG occasions, and the beam-sweeping SCI and the beam-ACK SCI are each associated with a respective counter value corresponding to one CG occasion of the specified number of CG occasions.

Aspect 10 is the method of any of aspects 1 to 9, where the first UE is configured by the base station with at least one PUCCH resource, the method further including: transmitting, to the base station, at least one ACK message via the at least one PUCCH resource to maintain at least some of the one or more CG resources.

Aspect 11 is the method of any of aspects 1 to 10, where the at least one second UE includes a plurality of second UEs, and the beam-sweeping SCI is transmitted via groupcast or broadcast.

Aspect 12 is the method of any of aspects 1 to 3, 5-7, 10, and 11, where the beam-sweeping SCI does not include a valid time window for the transmission of the beam-ACK SCI, the method further including: transmitting, to the base station, a beamforming alignment report based on the received beam-feedback SCI; and receiving, from the base station, a beamforming alignment decision based on the beamforming alignment report.

Aspect 13 is the method of any of aspects 1 to 12, where the one or more Tx beams are associated with a plurality of Tx beams, and the beam-sweeping SCI is associated with a plurality of DMRSs transmitted via two or more of the plurality of Tx beams.

Aspect 14 is the method of aspect 13, where the beam-sweeping SCI is associated with a lowest MCS.

Aspect 15 is a method of wireless communication at a second UE, including: receiving, from at least one first UE via one or more Rx beams on one or more CG resources, beam-sweeping SCI for a beamforming alignment procedure, the beam-sweeping SCI including at least one of: a Tx beam index, a time period for monitoring for beam-feedback SCI, or a time window including CG occasions for a same beam transmission of beam-ACK SCI; transmitting, to the at least one first UE, the beam-feedback SCI within the time period; and monitoring, over the one or more CG resources, for beam-ACK SCI based on the transmitted beam-feedback SCI.

Aspect 16 is the method of aspect 15, further including: receiving, from a base station, a beamforming indication for the beamforming alignment procedure.

Aspect 17 is the method of aspect 16, where the reception of the beam-sweeping SCI on the one or more CG resources is in response to the beamforming indication received from the base station.

Aspect 18 is the method of any of aspects 16 and 17, where the beamforming indication includes an identifier of the at least one first UE.

Aspect 19 is the method of any of aspects 15 to 18, where the beamforming alignment procedure corresponds to sidelink mode 1.

Aspect 20 is the method of any of aspects 15 to 19, further including: receiving, from the at least one first UE via the one or more CG resources, the beam-ACK SCI based on the transmitted beam-feedback SCI.

Aspect 21 is the method of any of aspects 15 to 20, where the beam-feedback SCI includes at least one of: an indication of a best Tx beam on which the beam-sweeping SCI was transmitted, an indication of a best Rx beam on which the beam-sweeping SCI was received, or a link quality metric.

Aspect 22 is the method of any of aspects 15 to 21, where the beam-sweeping SCI specifies at least one resource for transmission of the beam-feedback SCI, the method further including: transmitting, to the at least one first UE, the beam-feedback SCI via the specified at least one resource.

Aspect 23 is the method of any of aspects 15 to 21, further including: transmitting, to the at least one first UE, the beam-feedback SCI via at least one PSFCH resource corresponding to a PSSCH via which the beam-sweeping SCI is transmitted.

Aspect 24 is the method of any of aspects 15 to 23, where the beam-ACK SCI includes at least one of: an indication of an Rx beam, a link quality metric, or an indication of a completion of the beamforming alignment procedure.

Aspect 25 is the method of any of aspects 15 to 24, where the one or more CG resources correspond to a CG duration including a specified number of CG occasions, and the beam-sweeping SCI and the beam-ACK SCI are each associated with a respective counter value corresponding to one CG occasion of the specified number of CG occasions.

Aspect 26 is the method of any of aspects 15 to 19 and 21 to 23, where the beam-sweeping SCI does not include a valid time window for the transmission of the beam-ACK SCI, the method further including: receiving, from a base station, a beamforming alignment decision, the beamforming alignment decision being based on a beamforming alignment report.

Aspect 27 is the method of any of aspects 15 to 26, where the one or more Tx beams are associated with a plurality of Tx beams, and the beam-sweeping SCI is associated with a plurality of DMRSs via two or more of the plurality of Tx beams.

Aspect 28 is the method of aspect 27, where the beam-sweeping SCI is associated with a lowest MCS.

Aspect 29 is an apparatus for wireless communication including at least one processor coupled to a memory and configured to implement a method as in any of aspects 1 to 28.

Aspect 30 is an apparatus for wireless communication including means for implementing a method as in any of aspects 1 to 28.

Aspect 31 is a computer-readable medium storing computer executable code, where the code when executed by a processor causes the processor to implement a method as in any of aspects 1 to 28.

What is claimed is:

1. An apparatus for wireless communication at a first user equipment (UE), comprising:
    a memory; and
    at least one processor coupled to the memory and configured to:
        receive, from a base station, a configured grant (CG) indicating one or more CG resources for a beamforming alignment procedure;
        transmit, to at least one second UE via one or more transmission (Tx) beams on the one or more CG resources, beam-sweeping sidelink control information (SCI) for the beamforming alignment procedure, the beam-sweeping SCI including at least one of: a Tx beam index, a time period to monitor for beam-feedback SCI associated with the beamforming alignment procedure, or a time window including CG occasions for a same beam transmission of beam-acknowledgement (ACK) SCI;
        monitor, over the time period, for the beam-feedback SCI from the at least one second UE, wherein the beam-feedback SCI comprises at least one of: an indication of a best Tx beam on which the beam-sweeping SCI was transmitted, or an indication of a best Rx beam on which the beam-sweeping SCI was received; and
        transmit, to the at least one second UE via the one or more CG resources, the beam-ACK SCI based on the received beam-feedback SCI.

2. The apparatus of claim 1, wherein the beamforming alignment procedure corresponds to sidelink mode 1.

3. The apparatus of claim 1, wherein the at least one processor is further configured to:
    receive, from the at least one second UE, the beam-feedback SCI within the time period.

4. The apparatus of claim 1, wherein the beam-feedback SCI further comprises at least a link quality metric.

5. The apparatus of claim 1, wherein the beam-sweeping SCI specifies at least one resource for transmission of the beam-feedback SCI, and the at least one processor is further configured to:
    receive, from the at least one second UE, the beam-feedback SCI via the specified at least one resource.

6. The apparatus of claim 1, wherein the at least one processor is further configured to:
    receive, from the at least one second UE, the beam-feedback SCI via at least one physical sidelink feedback channel (PSFCH) resource corresponding to a physical sidelink shared channel (PSSCH) via which the beam-sweeping SCI is transmitted.

7. The apparatus of claim 1, wherein the beam-ACK SCI comprises at least one of: an indication of an Rx beam, a link quality metric, or an indication of a completion of the beamforming alignment procedure.

8. The apparatus of claim 1, wherein the one or more CG resources correspond to a CG duration including a specified number of CG occasions, and the beam-sweeping SCI and the beam-ACK SCI are each associated with a respective counter value corresponding to one CG occasion of the specified number of CG occasions.

9. The apparatus of claim 1, wherein the first UE is configured by the base station with at least one physical uplink control channel (PUCCH) resource, and the at least one processor is further configured to:
    transmit, to the base station, at least one ACK message via the at least one PUCCH resource to maintain at least some of the one or more CG resources.

10. The apparatus of claim 1, wherein the at least one second UE comprises a plurality of second UEs, and the beam-sweeping SCI is transmitted via groupcast or broadcast.

11. The apparatus of claim 1, wherein the beam-sweeping SCI does not include a valid time window for the transmission of the beam-ACK SCI, and the at least one processor is further configured to:
    transmit, to the base station, a beamforming alignment report based on the received beam-feedback SCI; and
    receive, from the base station, a beamforming alignment decision based on the beamforming alignment report.

12. The apparatus of claim 1, wherein the one or more Tx beams are associated with a plurality of Tx beams, and the beam-sweeping SCI is associated with a plurality of demodulation reference signals (DMRSs) transmitted via two or more of the plurality of Tx beams.

13. The apparatus of claim 12, wherein the beam-sweeping SCI is associated with a lowest modulation and coding scheme (MCS).

14. A method of wireless communication at a first user equipment (UE), comprising:
    receiving, from a base station, a configured grant (CG) indicating one or more CG resources for a beamforming alignment procedure;
    transmitting, to at least one second UE via one or more transmission (Tx) beams on the one or more CG resources, beam-sweeping sidelink control information (SCI) for the beamforming alignment procedure, the beam-sweeping SCI including at least one of: a Tx beam index, a time period to monitor for beam-feedback SCI associated with the beamforming alignment procedure, or a time window including CG occasions for a same beam transmission of beam-acknowledgement (ACK) SCI;
    monitoring, over the time period, for the beam-feedback SCI from the at least one second UE, wherein the beam-feedback SCI comprises at least one of: an indication of a best Tx beam on which the beam-sweeping SCI was transmitted, or an indication of a best Rx beam on which the beam-sweeping SCI was received; and
    transmitting, to the at least one second UE via the one or more CG resources, the beam-ACK SCI based on the received beam-feedback SCI.

15. An apparatus for wireless communication at a second user equipment (UE), comprising:
a memory; and
at least one processor coupled to the memory and configured to:
receive, from at least one first UE via one or more reception (Rx) beams on one or more configured grant (CG) resources, beam-sweeping sidelink control information (SCI) for a beamforming alignment procedure, the beam-sweeping SCI including at least one of: a transmission (Tx) beam index, a time period for monitoring for beam-feedback SCI associated with the beamforming alignment procedure, or a time window including CG occasions for a same beam transmission of beam-acknowledgement (ACK) SCI;
transmit, to the at least one first UE, the beam-feedback SCI within the time period, wherein the beam-feedback SCI comprises at least one of: an indication of a best Tx beam on which the beam-sweeping SCI was transmitted, or an indication of a best Rx beam on which the beam-sweeping SCI was received;
monitor, over the one or more CG resources, for beam-ACK SCI based on the transmitted beam-feedback SCI; and
receive, from the at least one first UE via the one or more CG resources, the beam-ACK SCI based on the transmitted beam-feedback SCI.

16. The apparatus of claim 15, wherein the at least one processor is further configured to:
receive, from a base station, a beamforming indication for the beamforming alignment procedure.

17. The apparatus of claim 16, wherein the reception of the beam-sweeping SCI on the one or more CG resources is in response to the beamforming indication received from the base station.

18. The apparatus of claim 16, wherein the beamforming indication comprises an identifier of the at least one first UE.

19. The apparatus of claim 15, wherein the beamforming alignment procedure corresponds to sidelink mode 1.

20. The apparatus of claim 15, wherein the beam-feedback SCI further comprises at least a link quality metric.

21. The apparatus of claim 15, wherein the beam-sweeping SCI specifies at least one resource for transmission of the beam-feedback SCI, and the at least one processor is further configured to:
transmit, to the at least one first UE, the beam-feedback SCI via the specified at least one resource.

22. The apparatus of claim 15, wherein the at least one processor is further configured to:
transmit, to the at least one first UE, the beam-feedback SCI via at least one physical sidelink feedback channel (PSFCH) resource corresponding to a physical sidelink shared channel (PSSCH) via which the beam-sweeping SCI is transmitted.

23. The apparatus of claim 15, wherein the beam-ACK SCI comprises at least one of:
an indication of an Rx beam, a link quality metric, or an indication of a completion of the beamforming alignment procedure.

24. The apparatus of claim 15, wherein the one or more CG resources correspond to a CG duration including a specified number of CG occasions, and the beam-sweeping SCI and the beam-ACK SCI are each associated with a respective counter value corresponding to one CG occasion of the specified number of CG occasions.

25. The apparatus of claim 15, wherein the beam-sweeping SCI does not include a valid time window for the transmission of the beam-ACK SCI, and the at least one processor is further configured to:
receive, from a base station, a beamforming alignment decision, the beamforming alignment decision being based on a beamforming alignment report.

26. The apparatus of claim 15, wherein the one or more Tx beams are associated with a plurality of Tx beams, and the beam-sweeping SCI is associated with a plurality of demodulation reference signals (DMRSs) via two or more of the plurality of Tx beams.

27. The apparatus of claim 26, wherein the beam-sweeping SCI is associated with a lowest modulation and coding scheme (MCS).

28. A method of wireless communication at a second user equipment (UE), comprising:
receiving, from at least one first UE via one or more reception (Rx) beams on one or more configured grant (CG) resources, beam-sweeping sidelink control information (SCI) for a beamforming alignment procedure, the beam-sweeping SCI including at least one of: a transmission (Tx) beam index, a time period for monitoring for beam-feedback SCI associated with the beamforming alignment procedure, or a time window including CG occasions for a same beam transmission of beam-acknowledgement (ACK) SCI;
transmitting, to the at least one first UE, the beam-feedback SCI within the time period, wherein the beam-feedback SCI comprises at least one of: an indication of a best Tx beam on which the beam-sweeping SCI was transmitted, or an indication of a best Rx beam on which the beam-sweeping SCI was received;
monitoring, over the one or more CG resources, for beam-ACK SCI based on the transmitted beam-feedback SCI; and
receiving, from the at least one first UE via the one or more CG resources, the beam-ACK SCI based on the transmitted beam-feedback SCI.

* * * * *